S. McL. AUGHINBAUGH.
FEED BAG ATTACHMENT.
APPLICATION FILED NOV. 1, 1912.
1,099,871.
Patented June 9, 1914.
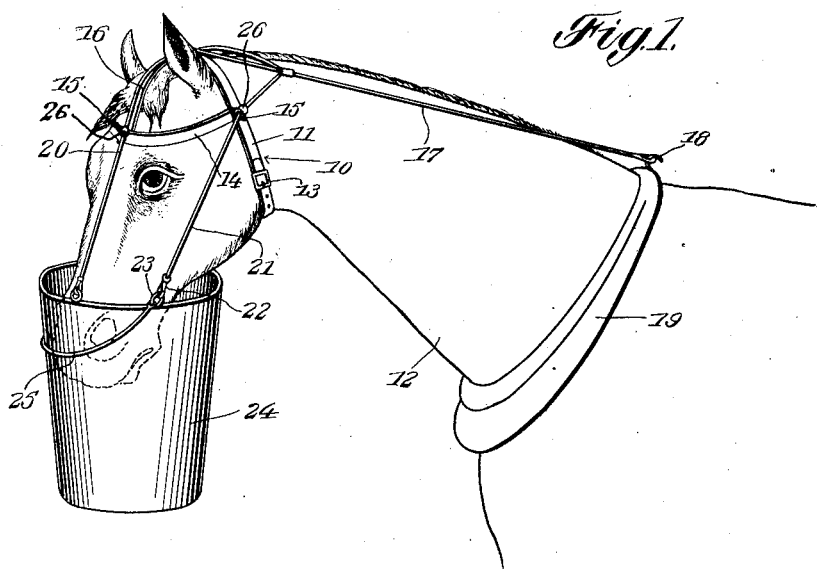
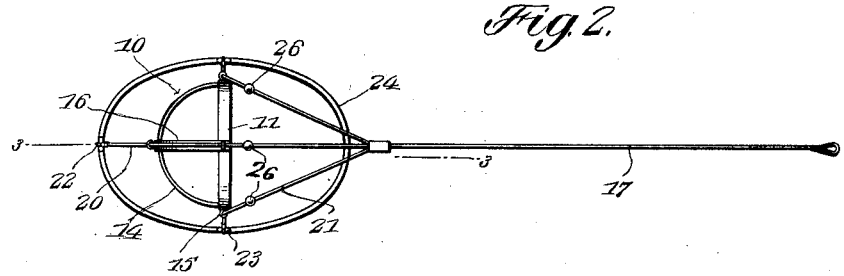
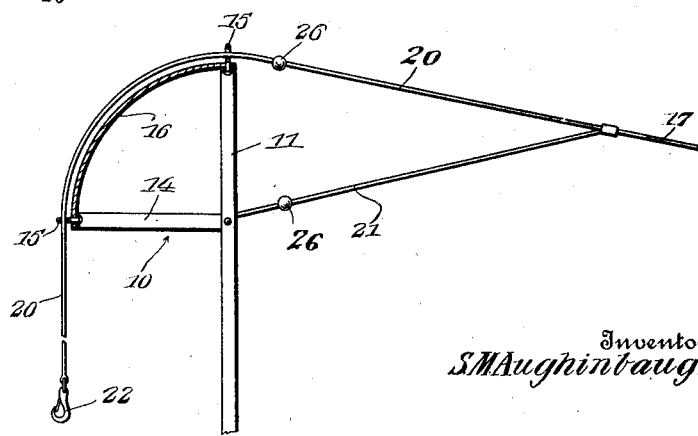

UNITED STATES PATENT OFFICE.

SIDNEY McLANAHAN AUGHINBAUGH, OF CHAMBERSBURG, PENNSYLVANIA.

FEED-BAG ATTACHMENT.

1,099,871. Specification of Letters Patent. Patented June 9, 1914.

Application filed November 1, 1912. Serial No. 729,144.

*To all whom it may concern:*

Be it known that I, SIDNEY MCLANAHAN AUGHINBAUGH, a citizen of the United States, residing at Chambersburg, in the county of Franklin and State of Pennsylvania, have invented new and useful Improvements in Feed-Bag Attachments, of which the following is a specification.

An object of the invention is to provide a device for supporting a feed bag in feeding position on the head of a horse or other animal.

The invention embodies, among other features, a structure mounted upon the horse in a manner similar to that of a bridle and having movable cords or members connected to a feed bag, whereby, when the horse or other animal moves its head downwardly, the feed bag will be elevated into feeding position to enable the horse to readily secure the feed in the bag.

The invention further embodies a structure whereby, when the bag is in feeding position, the feed will be prevented from being accidentally pushed or forced out of the bag due to a sudden jerk of the head of the horse.

In the further disclosure of the invention reference is to be had to the accompanying drawings, constituting a part of this specification, in which similar characters of reference denote corresponding parts in all the views, and in which—

Figure 1 is a perspective view, showing my device in applied position; Fig. 2 is a plan view of the attachment; and Fig. 3 is a vertical sectional view taken on the line 3—3 in Fig. 2.

Referring more particularly to the views, use is made of a harness 10 including a strap 11 adapted to pass around the head of a horse 12, with the ends of the strap connected by a suitable buckle 13, the upper end of the strap being arranged in the rear of the ears of the horse and the lower end passing around the under side of the neck thereof. A cross strap 14 has the ends thereof connected to the strap 11 by suitable rivet like eyelets 15 and a vertical strap 16 connects the cross strap 14 at its medial portion with the strap 11 at the upper portion thereof, the ends of the strap 16 being connected to the cross strap 14 and strap 11 by eyelets similar to the eyelets 15, the said eyelets being provided to secure the heretofore mentioned straps in the designated positions and also act as pulleys for a purpose that will be hereinafter more fully described.

A cord 17 has an end thereof looped for connection with a hook 18 on the usual collar 19 of the horse 12 and connected to the forward end of the cord 17 is a head cord 20 and side cords 21, the head cord 20 being passed through the eyelets 15 connecting the vertical strap 16 to the strap 11 and cross strap 14 and the side cords 21 being passed through the eyelets 15, connecting the ends of the cross strap 14 with the strap 11, as shown, the forward free ends of the cords 20, 21 having suitable snaffle hooks 22 secured thereto and adapted for connection with rings 23 on a feed bag 24, the said feed bag being preferably made of metal and provided with a suitable bail 25. It will now be seen by referring to Fig. 1 that when the horse moves its head downwardly, the feed bag 24 will be drawn up toward the horse's head in order that the mouth of the horse will extend well into the feed bag, thus enabling the horse to readily eat the feed in the bag, the elevation of the feed bag toward the horse's head being accomplished through the medium of the head and side cords 20, 21 having connection with the main cord 17, as mentioned heretofore.

In order to limit the downward movement of the feed bag 24 relatively to the harness 10, a series of stop members 26 are secured to the head and side cords 20, 21, the said stop members being larger in cross sectional area than the eyelets 15 so that the said stop members will not readily pass through the eyelets, it being thus seen that when the feed bag 24 moves downwardly, the stop members 26 engaging the eyelets 15 will prevent a further downward movement of the feed bag so that the cords 20, 21, together with the stop members 26 and the eyelets 15, will support the feed bag on the harness 10.

From the foregoing description it will be seen that with a device of the character described, the harness 10 can be readily secured to the head of the horse, with the feed bag depending from the harness and readily movable into feeding position when the horse's head is moved forwardly and downwardly, and it will be further seen that the structure described consists of few and simple parts, and can be cheaply manufactured.

Having thus described my invention, I claim:

In a feed bag attachment, the combination with a harness for attachment to the head of an animal and including a head strap passing around the neck of the animal and a cross strap having its ends connected to the head strap, of centrally arranged eyelets on the harness, with one of the eyelets carried on the central portion of the cross strap and the other eyelet carried on the head strap and in vertical alinement with the eyelet on the cross strap, side eyelets carried on the head strap at the jucture of the ends of the cross strap therewith, a main cord for connection with the collar of the animal and extending forwardly to terminate immediately in the rear of the harness, a head cord passing through the central eyelets and depending in front of the nose of the animal, side cords passing through the side eyelets and depending along the sides of the head of the animal, a feed bag having the forward depending ends of the said head cord and side cords attached thereto, with the inner ends of the side cords terminating at the inner termini of the head cord, and the said side cords and head cord having connection with the main cord at their juncture, and stop members carried by the side cords and head cord and adapted to engage the said eyelets for limiting the lowering movement of the said feed bag when the said side cords and head cords are actuated by the motion of the head of the animal.

In testimony whereof I affix my signature in presence of two witnesses.

SIDNEY McLANAHAN AUGHINBAUGH.

Witnesses:
HIRAM J. WATTLES,
RICHARD B. THOMPSON.

---

Copies of this patent may be obtained for five cents each, by addressing the "Commissioner of Patents, Washington, D. C."